Sept. 17, 1963  B. G. WATTERS  3,103,941
METHOD OF AND APPARATUS FOR CONTROLLING FLUID FLOW
Filed March 25, 1960  3 Sheets-Sheet 1

INVENTOR.
BILL GENE WATTERS
BY Rines and Rines
ATTORNEYS

Sept. 17, 1963 B. G. WATTERS 3,103,941
METHOD OF AND APPARATUS FOR CONTROLLING FLUID FLOW
Filed March 25, 1960 3 Sheets-Sheet 2

INVENTOR.
BILL GENE WATTERS
BY Rines and Rines
ATTORNEYS

Sept. 17, 1963    B. G. WATTERS    3,103,941
METHOD OF AND APPARATUS FOR CONTROLLING FLUID FLOW
Filed March 25, 1960    3 Sheets-Sheet 3

INVENTOR.
BILL GENE WATTERS
BY Rines and Rines
ATTORNEYS

United States Patent Office 3,103,941
Patented Sept. 17, 1963

3,103,941
METHOD OF AND APPARATUS FOR CONTROLLING FLUID FLOW
Bill Gene Watters, Nahant, Mass., assignor to Bolt Beranek and Newman, Inc., Cambridge, Mass., a corporation of Massachusetts
Filed Mar. 25, 1960, Ser. No. 17,577
15 Claims. (Cl. 137—1)

The present invention relates to methods of and apparatus for controlling fluid flow; particularly, to control valves designed to produce a fluid flow that can be controlled by two independent and variable functions.

The flow of fluid in a closed system, such as air or liquid, is commonly controlled by a two-element valve, one element of which is fixed and the other of which moves relative to the first so as to change the effective open area through which fluid may flow. This type of valve, whether slow or fast acting, is capable of controlling the flow according to a single function of time. For some purposes, however, it is necessary to control the flow of fluid according to two arbitrary functions at the same time. As an illustration, in the design of a siren that is to produce a predetermined controlled wave form output with amplitude modulation, independently movable controls are required, as later explained, controlled by two arbitrary functions.

An object of the present invention, accordingly, is to provide a new and improved method of and apparatus for changing the flow of fluid according to two independent control functions, and without the need of an auxiliary mixing device which otherwise would be necessary to combine the two functions into a single function.

A further object is to provide a novel siren and the like. To this end, two control signals may be employed to produce a flow proportional to the product of the two control functions.

An additional object is to provide a novel siren and the like provided with means for rapidly varying the acoustic output of the siren so as to produce amplitude modulation according to a prescribed program, while maintaining a prescribed wave form.

Other and further objects will be explained hereinafter and will be more particularly pointed out in connection with the appended claims.

The invention will now be described in connection with the aciompanying drawing, FIG. 1 of which is a perspective view, partly in section, of a three-element valve subject to disadvantages overcome by the present invention;

Figure 1:
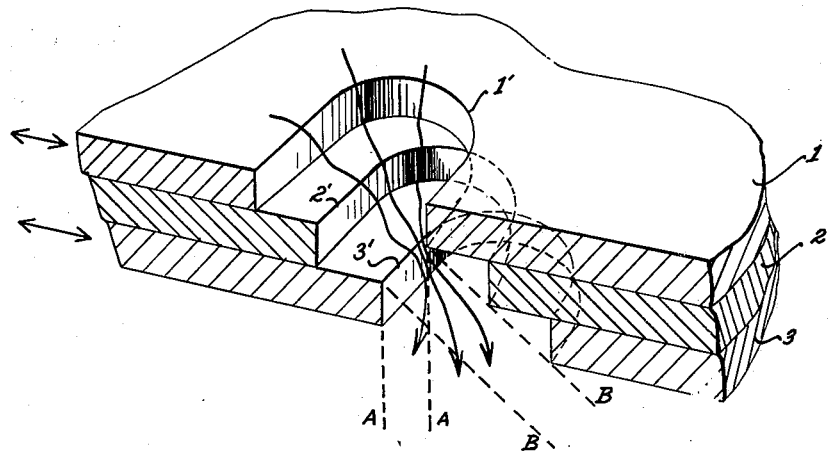

Referring to FIG. 1, a fluid-flow valve, such as a siren or the like, is shown comprising relatively movable substantially parallel juxtaposed planar members 1 and 2, correspondingly apertured or ported at 1' and 2', so that relative movement thereof causes the apertures or ports 1' and 2' to become aligned in various degrees to throttle in varying degrees fluid flow, such as air or liquid, therethrough. The flow through the valve 1, 2 is controlled by the amount of port open area common to both the openings or ports 1' and 2' and by the shape of the edge of the openings, but not significantly influenced by the resulting shape of the over-all open area itself. Thus, a rounded edge of the opening might increase the flow, but the fact that the opening periphery is not round or of other shape, does not affect significantly the flow through the aperture. The flow, indeed, as explained in my joint article with C. H. Allen, "Siren Design for Producing Controlled Wave Form With Amplitude Modulation," appearing in the April 1959 issue of the Journal of the Acoustical Society of America, and incorporated herein by reference, is given substantially by the equation (in the case of air flow that is to be controlled substantially in accordance with a sinusoidal wave form):

$$A = \frac{W_0 + W_a \sin \theta}{Ckf\rho}[T_1/P_1(P_1-P_2-p \sin \theta)]^{1/2} \quad (1)$$

where $A$=port open area, $W_0$=steady mass flow of air, $W_a$=amplitude of the acoustic mass flow, $\theta$=siren rotor angle times the number of rotor openings or apertures, $C$=flow coefficient for the siren port, $k$=a numerical constant depending upon units used, $f$=a compression factor, $\rho$=density of free air at room temperature, $T_1$=absolute temperature in the siren chamber, $P_1$=pressure in the siren chamber, $P_2$=pressure at the discharge side of the siren ports, and $p$=acoustic pressure amplitude across the siren ports; this includes the total effect of forward and backward radiating acoustic waves at the siren ports.

Equation 1 gives the time variation of area which applies for the generation of a sine wave of pressure at any one set of operating conditions. If a wave form other than sinusoidal is desired, the $\sin \theta$ terms in Eq. 1 may be replaced by a function describing the new wave form provided only that the slope of the time variation of area remains finite and within practical limits.

From this equation it is seen that the flow is proportional to the open area common to both elements 1 and 2 and is to the same extent proportional to the flow coefficient C, which is substantially constant so long as the geometry of the opening is reasonably constant. It has been found, for example, that where the edges of the openings 1' and 2' are maintained as sharp square edges, as shown in FIG. 1, the flow coefficient C is approximately 0.7, and that it does not vary with the shape of the common open area of the two valve elements 1 and 2.

One cannot, however, merely by adjusting the fluid pressure, change the amplitude of the siren output and still maintain the predetermined sinusoidal or other predetermined output wave form. In a conventional siren, the output level is controlled by adjusting the chamber pressure. This operation, however, changes the ratio of the acoustic pressure to the chamber pressure, and from Eq. 1 it is seen that this alters the wave form. When the wave form must be maintained within close limits, the output level cannot be changed by controlling the operating pressure alone except when the acoustic pressure is negligibly small compared with the operating pressure. This type of operation is inefficient and generally is practical only for low power operation.

The requirement for increased dynamic range and amplitude modulation necessitates the addition of a third member 3 which acts as a shutter or, alternatively, a modulator when it is operated in a continuous way to produce amplitude modulation of acoustic signal. The rotor, which may be the member or element 1, the stator 2, and the shutter 3 are arranged with the shutter 3 operating on one side of the stator 2 to produce either a step-wise or a relatively slow variation in the maximum effective port area and thereby to adjust the average output level and/or produce amplitude modulation of the acoustic signal. The rotor 1 is intended to operate on the other side of the stator 2 and rapidly modulate the steady flow of air so as to produce a sinusoidal or other desired acoustic pressure wave in the acoustic load regardless of the shutter setting.

The rotor 1, stator 2, and shutter 3 thus form a three element valve in which the two moving elements 1 and 3 must independently modulate the amount of air flow. The principal problem in such a valve lies in the fact that the stationary member, the stator 2, has finite thickness and air may move sideways through the stator port as shown by the arrowed fluid lines. Therefore, when both rotor and stator attempt to control the air flow, either one or both lose control to an undetermined extent, the desired flow area A—A being unobtainable, and the sideways motion of air within the confines of the thickness of the stator 2, permitting the air to pass almost unconstricted in the effective flow area B—B.

The amount by which the flow of fluid exceeds the desired amount will be undetermined and cannot be compensated for by re-shaping the valves because the undetermined amount of flow depends upon the relative positions of the elements 1 and 3. The error in the flow could be reduced by reducing the thickness of the stationary member 2, but the stator 2 would then become mechanically fragile and unable to support any substantial fluid pressure. It has therefore been found necessary to confine the flow of fluid in the region within the thickness of member 2 to a straight line flow perpendicular to the surfaces of the stator 2.

Figure 2:
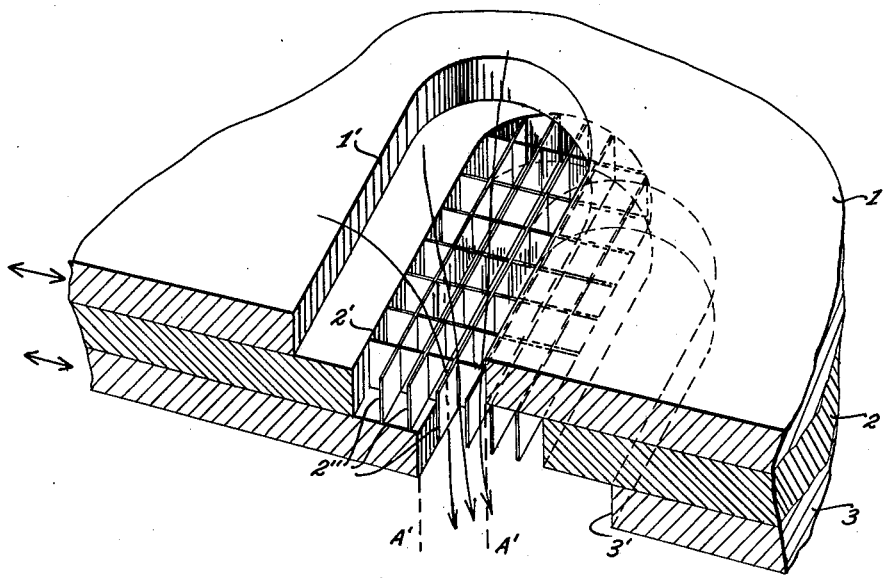
FIG. 2 is a siimlar view of a valve constructed in accordance with the present invention.

In FIG. 2, accordingly, the flow of fluid is again controlled by a three-element valve in which the opening 2' in the stator 2 is broken up by a fine cellular or compartmental structure 2", shown as a honey-comb structure, so that the air entering a cell 2" at the top surface of member 2 exits at the bottom surface thereof from the very same cell 2". In this way, lateral motion of the air is prevented. The amount of air permitted to leave the bottom of element 2 is now governed exclusively by the contours of the openings 1' and 3' as indicated at A'A'. Since no fluid can flow through any cell 2" which is closed on both ends, fluid can flow only through those cells which are open on at least one end. In general, any one cell 2" will be either completely open or completely closed at either or both ends, and the flow will be a maximum or zero. Some cells will be partially restricted by one or the other of the two moving members. If a cell 2" is covered partially at only one end, then the flow of fluid through that cell is governed by its shape and only the contour of the opening of that moving member which partially covers the one end of the cell. Thus, whether the cell is partially covered from above or partially covered from below, the moving element which partially covers that cell has complete control of the fluid flow through that cell. Only when both moving members attempt to govern the flow through a single cell is there any ambiguity as to the amount of flow which will be permitted. In general, if the edges of the openings 1' and 3' are non-parallel, there will be only one cell 2" at a time over which the two members 1 and 3 will attempt to provide control. The use of honeycomb or other similar fine cellular structure 2", thus reduces the region of uncertainty from an area which is a large fraction of the aperture 3' to an area which is approximately one cell 2".

Where the contours of the openings 1' and 3' are of complicated geometrical design, such that they may cross in more than one point, then an increasing number of cells 2" will be required to maintain a specified degree of control.

This problem has thus been solved by the use of a honeycomb or similar structure 2" in the stator port 2' to break the port 2' into a large number of small holes. When lateral flow of air is prevented in this way, the rotor 1 and shutter 3 each can control portions of the stator port 2' independently. The only undetermined flow area remaining is that for which both rotor and shutter attempt to control a single honeycomb cell 2". The area of such a cell is small compared to the total flow area and is generally a negligible percentage of the maximum opening. The net result, with proper rotor and shutter shaping, is a wave of the desired form having a small high-frequency ripple superimposed. This ripple may be reduced in importance by the fact that the honey-comb may be positioned randomly, as at 22' in FIG. 5B, and no definite ripple frequency exists. Since there are a number of ports, moveover, the ripple from the several ports has a random phase and tends to add on a power basis, whereas the fundamental sinusoidal signals from all parts are in phase and add on a current basis. Thus the ripple becomes negligible when the siren has the several ports above described.

Figure 4:
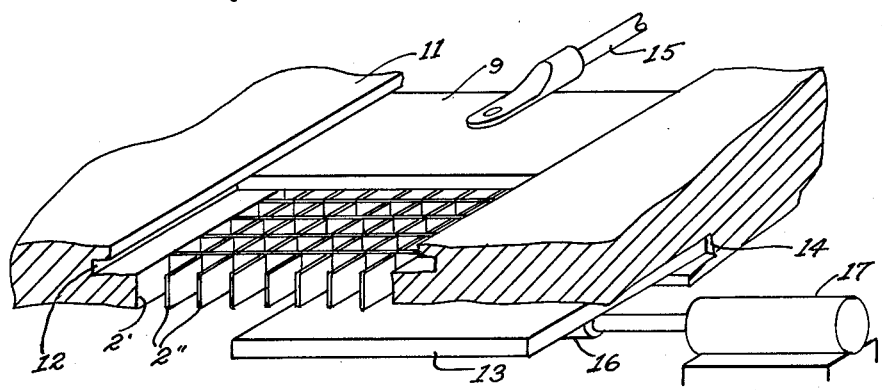
FIG. 4 is a similar view of a modified valve.

Referring to FIG. 4, a generalized valve is illustrated, embodying the invention, and that can be used for the generation of a fluid flow that is proportional to the product of two functions. A stationary member 11 is provided with an opening 2' and, bounding the same, upper longitudinal slots 12 and lower transverse slots 14. A movable member 13 slides transversely across the opening 2' within slots 14, in response to an hydraulic or other control 16—17, introducing a first actuating function. A similar movable element 9 slides orthogonal thereto longitudinally across the opening 2' in response to the control member 15, representing a second actuating function. The cellular sub-divisions 2" within the opening 2', having walls running parallel and perpendicular to the motions of the two moving members 9 and 13, thus enable the members 9 and 13 to control the fluid flow output in accordance with the two functions.

In all cases, in order for maximum flexibility of the shape of the valve-element openings and the range of the function variation which can be obtained with the valve combination of the present invention, it is preferable that thee three elements operate in separate planes so that their excursions can overlap. If these elements do not overlap, then at least two must meet so that their edges will seal together if a complete closure is needed.

Figure 3:
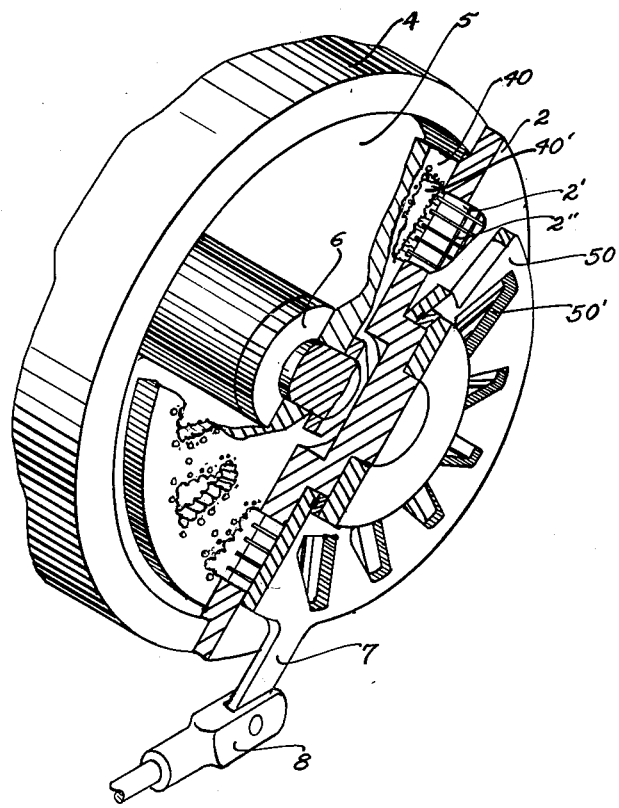
FIG. 3 is a partly sectionalized perspective view of a siren embodying the invention in preferred form.

The invention is not limited, of course, to the valve shapes previously described. Referring to the rotary siren of FIG. 3, as described in my said article, a circular-disc shutter 50 is independently controllable, as by the link arms 7 and 8, to modulate the output, in accordance with any predetermined law; and the circular-disc rotor 40 with its plurality of apertures 40' is rotated by a shaft 6 centrally disposed along the axis of the cylindriced housing 4, fluid flow occurring within the space 5.

Figure 7A:
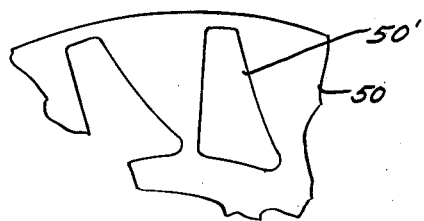
FIGS. 7A and 7B are fragmentary front elevations of preferred stator and rotor structures.

The apertures for the rotor 40 stator 2 and shutter 50 can have an endless variety of shapes. It is necessary only that the time variation of area at any shutter setting follows Eq. 1 within the required accuracy. In the siren design of FIG. 3, the shutter apertures were shaped somewhat triangularly as more clearly shown at 50' in FIG. 7A, so as to decrease the maximum port area primarily by decreasing the stator slot length. The shutter limits the maximum port area in a nearly logarithmic way over a range of 10 to 1; i.e., an approximately linear change in acoustic output level over a range of 20 db.

Figure 6A:
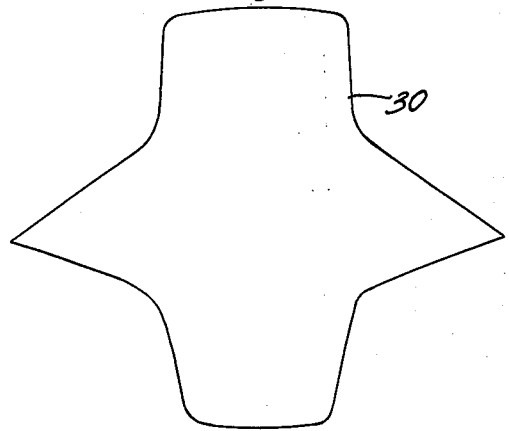
FIGS. 6A and 6B are contours of stator and rotor opening peripheries.
Figure 6B:
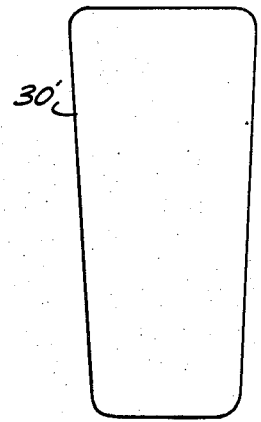
Figure 7B:
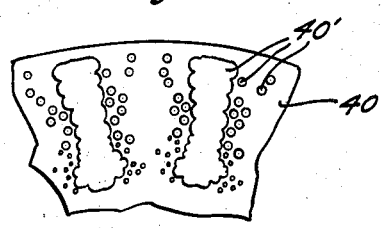

The rotor apertures 40', although apparently complicated, are relatively simple in design. Their shape results from the requirement that the time variation of area must follow Eq. 1 at each setting of the shutter over its entire range. As the shutter 50 opens, the acoustic pressure increases while the steady operating pressure remains constant; thus, the ratio of $\rho$ to $P_1-P_2$ varies and the time variation of port area must alter gradually in order to maintain a constant wave form in the output signal. For a single shutter setting, the rotor aperture could be designed as a simple opening having a wide middle and a narrowing tail on either side, as shown at 30 in FIG. 6A, for operation with a stator opening 30', FIG. 6B. The complicated appearance of the present rotor 40 results from the spreading out of the tail of the aperture by the use of numerous small holes 40', FIG. 7B. The holes were laid out to give an accurate agreement with Eq. 1 for five settings of the shutter, and it was assumed that the hole structure was fine enough that a good approximation to the required area variation would result at intermediate shutter positions.

In particular, when the shutter 50 is nearly closed, the acoustic pressure is small compared with the operating pressure. The time variation of area given by Eq. 1 under this condition is nearly sinusoidal and almost independent of the operating pressure. For this reason, when the shutter 50 is nearly closed, the siren will generate a sinusoidal wave not only at the design pressure but at pressures which are down by at least 10 to 1. Thus, the total expected dynamic range of sinusoidal signal generation is 40 db, 20 db due to shutter closing and an additional 20 db due to a permissible decrease in the operating pressure when the shutter is nearly closed.

Figure 5A:
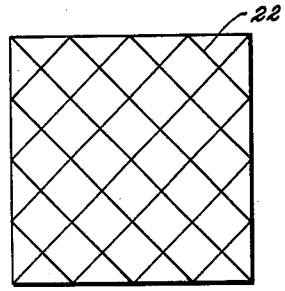
FIGS. 5A through 5C are plain views of modified cellular valve structures.
Figure 5B:
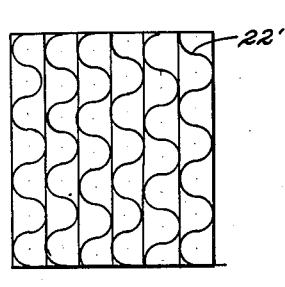
Figure 5C:
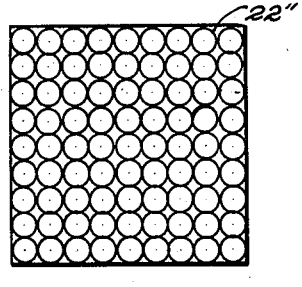

Other types of stator sub-divisions or cellular members than the honeycomb structures 2" or 22' may also be employed, such as the diagonally interesting orthogonal septa 22 of FIG. 5A or the circular cells 22" of FIG. 5C, and, of course, further modifications will also occur to those skilled in the art, which are considered to fall within the spirit and scope of the invention as defined in the appended claims.

What is claimed is:

1. A valving mechanism for producing a controlled fluid flow output that follows a predetermined wave form comprising three juxtaposed apertured members the apertures of which may become at least in part aligned during relative movement of the members to control fluid flow there-between, the apertures of the two outer members of the three juxtaposed members being shaped so that, for a plurality of positions thereof relative to the third inner member, the fluid flow output follows the said predetermined wave form, and the said third member aperture being subdivided into a plurality of cells of area small compared with that of the apertures of the first and second members and extending in the direction of the fluid flow between the apertures of the first and second members.

2. A valving mechanism as claimed in claim 1 and in which means is provided for independently moving the said first and second members relative to the third member.

3. A valving mechanism as claimed in claim 1 and in which the three members are substantially planar.

4. A valving mechanism as claimed in claim 3 and in which the three members are disc-shaped with each provided with a plurality of the said apertures, and in which means are provided for rotating the said first member relative ot the third member, and for permitting independent rotational movement of the second member relative to the third member to control the amplitude of the said fluid flow output.

5. A valving mechanism as claimed in claim 4 and in which the first-member apertures each comprise a main section and adjacent aperture tails emanating therefrom.

6. A valving mechanism as claimed in claim 5 and in which the aperture tails comprise a plurality of small individual holes.

7. A valving mechanism as claimed in claim 6 and in which the second-member apertures are shaped somewhat triangularly.

8. A valving mechanism as claimed in claim 7 and in which the third-member cells comprise a honeycomb-type structure.

9. A valving mechanism as claimed in claim 8 and in which the honeycomb walls are randomly positioned over the third-member aperture.

10. A method of fluid control that comprises constricting the flow of fluid through at least partially alined oppositely disposed openings, spacing the openings from one another a distance sufficient that the cross-sectional area of fluid flow therebetween is different for different angular directions of flow between the openings, and channelling the flow as it passes between the oppositely disposed openings into a plurality of small individual paths extending in the direction between the openings and of area much smaller than that of the openings.

11. A method of fluid control as set forth in claim 10 and in which the further step is performed of relatively moving at least one of the oppositely disposed openings with respect to the small paths.

12. A method of fluid control as set forth in claim 10 and in which the further step is performed of independently moving both the said oppositely disposed openings with respect to the small paths.

13. A method of fluid control as set forth in claim 10 and in which the stream of fluid passing through the said openings is shaped so as to provide a predetermined wave-form of fluid flow beyond the said openings.

14. A method of fluid control as set forth in claim 13 and in which the said wave-form is substantially sinusoidal.

15. A valving mechanism for producing a controlled fluid flow that follows a predetermined law, comprising first and second members movably juxtaposed with respect to a third member, said members having apertured areas with holes which may become at least in part aligned during relative movement of the members to control fluid flow therethrough, the apertured area of said first member also having a plurality of spaced additional holes much smaller than the aforementioned holes, such that as said first member moves with respect to said second member the fluid flow therethrough varies in accordance with said predetermined law for a plurality of positions of said second member relative to said third member.

References Cited in the file of this patent

UNITED STATES PATENTS 1,209,503 Schenkelberger _____ Dec. 19, 1916

FOREIGN PATENTS 402,203 France _____ of 1909
424,024 Great Britain _____ Feb. 3, 1935